United States Patent
Bent et al.

(10) Patent No.: US 7,769,688 B1
(45) Date of Patent: Aug. 3, 2010

(54) MONEY FUND BANKING SYSTEM

(75) Inventors: Bruce Bent, Manhasset, NY (US);
Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 0 days.

(21) Appl. No.: 11/840,060

(22) Filed: Aug. 16, 2007

Related U.S. Application Data

(60) Division of application No. 10/305,439, filed on Nov. 26, 2002, which is a continuation-in-part of application No. 09/677,535, filed on Oct. 2, 2000, which is a continuation-in-part of application No. 09/176,340, filed on Oct. 21, 1998, now Pat. No. 6,374,231, said application No. 10/305,439 is a continuation-in-part of application No. 10/071,053, filed on Feb. 8, 2002, now Pat. No. 7,519,551, which is a continuation-in-part of application No. 09/176,340, filed on Oct. 21, 1998, now Pat. No. 6,374,231.

(51) Int. Cl.
*G06Q 40/00* (2006.01)
(52) U.S. Cl. .......................... 705/40; 235/379
(58) Field of Classification Search .................... 705/40
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |
| 4,597,046 A | 6/1986 | Musmanno | |
| 4,674,044 A | 6/1987 | Kalmus | |
| 4,694,397 A | 9/1987 | Grant | |
| 4,700,297 A | 10/1987 | Hagel | |
| 4,751,640 A | 6/1988 | Lucas et al. | |
| 4,774,663 A | 9/1988 | Musmanno | |

(Continued)

FOREIGN PATENT DOCUMENTS

JP 10-049590 2/1998

(Continued)

OTHER PUBLICATIONS

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
ABA to Approve System for Sharing Deposit Coverage, American Banker, Feb. 11, 2003.

(Continued)

*Primary Examiner*—Daniel S Felten
(74) *Attorney, Agent, or Firm*—Foley & Lardner LLP

(57) ABSTRACT

Providing interest to clients' deposited funds without the legal limitation on the number of demand withdrawals from deposit accounts is accomplished by an administration system that keeps all of the records for the clients' deposits and withdrawals, calculates the total of the deposits and withdrawals for all clients, and uses the calculation to determine whether funds are deposited to or withdrawn from a single deposit account in which all clients' deposit funds are kept. Clients can make unlimited withdrawals, such as by check, credit card, debit card, or electronic transfer, through the administrator. By placing the administrator as the holder of a single account, legal exemptions to the limitation on earning interest in demand accounts is facilitated.

5 Claims, 2 Drawing Sheets

U.S. PATENT DOCUMENTS

| | | | |
|---|---|---|---|
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano |
| 5,220,501 A | 6/1993 | Lawlor et al. |
| 5,235,507 A | 8/1993 | Sackler |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan |
| 5,424,938 A | 6/1995 | Wagner et al. |
| 5,631,828 A | 5/1997 | Hagan |
| 5,644,727 A | 7/1997 | Atkins |
| 5,671,363 A | 9/1997 | Cristofich |
| 5,689,650 A | 11/1997 | McClelland et al. |
| 5,710,889 A | 1/1998 | Clark |
| 5,765,144 A | 6/1998 | Larche |
| 5,774,880 A | 6/1998 | Ginsberg |
| 5,781,654 A | 7/1998 | Carney |
| 5,806,048 A | 9/1998 | Kiron et al. |
| 5,806,049 A | 9/1998 | Petruzzi |
| 5,812,987 A | 9/1998 | Luskin |
| 5,826,243 A | 10/1998 | Musmanno |
| 5,852,811 A | 12/1998 | Atkins |
| 5,864,685 A | 1/1999 | Hagan |
| 5,878,258 A | 3/1999 | Pizi |
| 5,878,405 A | 3/1999 | Grant et al. |
| 5,890,141 A | 3/1999 | Carney |
| 5,893,078 A | 4/1999 | Paulson |
| 5,903,881 A | 5/1999 | Schrader et al. |
| 5,905,974 A | 5/1999 | Fraser |
| 5,940,809 A | 8/1999 | Musmanno |
| 5,941,996 A | 8/1999 | Smith |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein |
| 6,014,642 A | 1/2000 | El-Kadi et al. |
| 6,016,482 A | 1/2000 | Molinari |
| 6,026,438 A | 2/2000 | Piazza |
| 6,041,314 A | 3/2000 | Davis |
| 6,044,371 A | 3/2000 | Person |
| 6,047,324 A | 4/2000 | Ford |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna |
| 6,112,191 A | 8/2000 | Burke |
| 6,119,093 A | 9/2000 | Walker et al. |
| 6,131,810 A | 10/2000 | Weiss |
| 6,154,770 A | 11/2000 | Kostakos |
| 6,189,785 B1 | 2/2001 | Lowery |
| 6,226,623 B1 | 5/2001 | Schein et al. |
| 6,374,231 B1 | 4/2002 | Bent et al. |
| 7,103,556 B2 | 9/2006 | Del Rey |
| 7,133,840 B1 | 11/2006 | Kenna et al. |
| 7,206,761 B2 | 4/2007 | Colvin |
| 7,216,100 B2 | 5/2007 | Elliott |
| 7,376,606 B2 | 5/2008 | Jacobsen |
| 7,440,914 B2 | 10/2008 | Jacobsen |
| 2001/0032182 A1 | 10/2001 | Kumar et al. |
| 2002/0007330 A1 | 1/2002 | Kumar et al. |
| 2002/0069147 A1 | 6/2002 | Sheehan et al. |
| 2002/0091637 A1 | 7/2002 | Bent |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0178098 A1 | 11/2002 | Beard |
| 2003/0023529 A1 | 1/2003 | Jacobsen |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0162773 A1 | 8/2004 | Del Rey et al. |
| 2004/0177036 A1 | 9/2004 | Nutahara et al. |
| 2005/0044038 A1 | 2/2005 | Whiting |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0154662 A1 | 7/2005 | Langenwalter |
| 2005/0228733 A1 | 10/2005 | Bent et al. |
| 2006/0047593 A1 | 3/2006 | Naratil et al. |
| 2006/0106703 A1 | 5/2006 | Del Rey et al. |
| 2006/0155644 A1 | 7/2006 | Reid et al. |
| 2006/0167773 A1 | 7/2006 | Yang et al. |
| 2006/0273152 A1 | 12/2006 | Fields |
| 2007/0043666 A1 | 2/2007 | Burdette |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0097899 A1 | 4/2008 | Jackson et al. |
| 2008/0133280 A1 | 6/2008 | Ziegler |

FOREIGN PATENT DOCUMENTS

| | | |
|---|---|---|
| WO | WO - 95/23379 | 8/1995 |
| WO | WO - 99/18529 | 4/1999 |
| WO | WO - 03/012580 | 2/2003 |
| WO | WO - 2005/006111 | 1/2005 |

OTHER PUBLICATIONS

American Banker Online—New Pitch: Deposit Insurance Sharing, Jan. 21, 2003, pp. 1-4.

Bent, "Bruce Bent Makes Money Market Funds Act Like Bank Accounts," Equity BBDP, Oct. 5, 1998, 3 Sheets.

Blackwell, Rob, "New Pitch: Deposit Insurance Sharing", American Banker Online, Jan. 21, 2003.

Britt, "Struggling with Sweep Accounts," America's Community Banker, vol. 6, No. 12, 11 Sheets, Dec. 1, 1997.

Certificate of Deposit Registry Service: Keeping deposits in the corn patch, Banknews, Mar. 2003.

Chapelle, "Merrill's Rivals Say They, Too. Offer Services Beyond Banking," Securities Data Publishing on Wall Street, 2 Sheets, Feb. 1, 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Heavyweight Funding, Bankers News, Mar. 4, 2003, pp. 1-2, vol. II, issue No. 5.
Hoffman, "Reserve's FDIC-Insured Account Draws Regionals; But some see little need for insurance," Crain Communications Inc., Investment News, 2 Sheets, Jun. 4, 2001.
Keenan, "Tapping Brokerages for Alternative to CDs," American Banker, The Financial Services Daily, 3 Sheets, Feb. 18, 2004.
Lavine, "Check Out High-Yield Checking Accounts," Broward Daily Business Review, vol. 39, No. 102, 2 Sheets, Apr. 27, 1998.
McReynolds, "The Power of Cash: Ho-hum cash can be great product (and lead to more business) in troubled times," Securities Data Publishing on Wall Street, 3 Sheets, Jun. 1, 2002.
McReynolds et al. "Unusual Products for Unusual Times," Securities Data Publishing on Wall Street, 6 Sheets, May 1, 2001.
News article: "Regulators Support Demand Deposit Bill", Regulatory Compliance Watch—Mar. 9, 1998; p. 1; vol. 9, No. 10.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network: http://www.promnetwork.com/index.html, 2003.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
"Man Bites Dog: Funds Move Into Banking," IBC's Money Fund Selector, 2 Sheets, Nov. 6, 1998.
About iMoneyNet, Inc., About iMoneyNet's Money Funds Division, 4 Sheets, Aug. 21, 2003, http://www.ibcdata.com/about.htm.
"Reverse Ups Insurance Limit on Money Market Account," Thomson Financial Inc., Mutual Fund Market News, 1 Sheet, Aug. 26, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
The Reserve Fund, Study of U.S. Patent No. 6,374,231, 1 Sheet.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
Reserve Management Corporation, Reserve Insured Deposits, U.S. Appl. No. 76/315,600, Issued.
The Reserve, "What Sets Us Apart," 2 Sheets, Oct. 4, 2006, http://www.ther.com/bank/bank_wsua.shtml.
The Reserve, "Reserve Insured Deposits," 2 Sheets, Oct. 4, 2006, http://www.ther.com/ps/ps_fif.shtml.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
Reserve Insured Deposits, United States Patent and Trademark Office, Reg. No. 2,694,910, Registered Mar. 11, 2003, 1 Sheet.
Capital Briefs: Corporate Checking Account Relief Sought, American Banker, vol. 162, Jul. 28, 1997, 1 Sheet.
Letter From William W. Wiles, Secretary of the Board, Board of Governors of the Federal Reserve System, Jun. 22, 1983, 6 Sheets.
DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Letter from Michael Bradfield, General Counsel, Board of Governors of the Federal Reserve System, Nov. 16, 1984, 4 Sheets.
Board of Governors of the Federal Reserve System, 1984 Fed. Res. Interp. Ltr. Lexis 56, Nov. 16, 1984, 3 Sheets.
Letter From Oliver I. Ireland, Associate General Counsel, Board of Governors of the Federal Reserve System, Jun. 22, 1988, 5 Sheets.
Board of Governors of the Federal Reserve System, 1988 Fed. Res. Interp. Ltr. Lexis 141, Jun. 22, 1988, 3 Sheets.
U.S. Appl. No. 60/307,815, filed Jul. 27, 2001.
U.S. Appl. No. 60/323,365, filed Sep. 20, 2001.
Board of Governors of the Federal Reserve System, 1989 Fed. Res. Interp. Ltr. Lexis 77, Mar. 14, 1989, 2 Sheets.
Board of Governors of the Federal Reserve System, 1989 Fed. Res. Interp. Ltr. Lexis 154, Jun. 21, 1989, 2 Sheets.
Board of Governors of the Federal Reserve System, 1990 Fed. Res. Interp. Ltr. Lexis 94, Feb. 1, 1990, 1 Sheet.
Board of Governors of the Federal Reserve System, 1991 Fed. Res. Interp. Ltr. Lexis 232, Jan. 30, 1991, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
Board of Governors of the Federal Reserve System, 1994 Fed. Res. Interp. Ltr. Lexis 156, Jun. 24, 1994, 3 Sheets.
CMA, Insured Savings Account Fact Sheet, Merrill Lynch, Pierce, Fenner & Smith Incorporated, Jul. 1994, pp. 47-54.
Board of Governors of the Federal Reserve System, 1994 Fed. Res. Interp. Ltr. Lexis 314, Oct. 17, 1994, 2 Sheets.
Board of Governors of the Federal Reserve System, 1994 Fed. Res. Interp. Ltr. Lexis 419, Oct. 14, 1994, 4 Sheets.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
Letter from Stephanie Martin, Assoc. General Counsel, Board of Governors of the Federal Reserve System, Apr. 22, 2004, 8 Sheets.
Bank Deposit Program, Online http://web.archive.org/web/20030620100115/http:/www.smithbarney.com/products_servi, Jan. 19, 2001, 4 Sheets.
Declaration of Mr. Bruce Bent II, Vice Chairman and Registrant of Applicant. (3 Sheets) and Exhibits A, B, C and D (6 Sheets).
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
FDIC Federal Register Citations: Email from Bert Ely to Comments, Mar. 8, 2006, Subject: Large-Bank Deposit Insurance Determination Proposal- RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Mr. James E. Creekman, Group Vice President, From Oliver Ireland, Associate General Counsel, Aug. 1, 1995, 4 Sheets.
Letter to Ms. Brenda L. Skidmore, Senior Vice President, From Oliver Ireland, Associate General Counsel, Aug. 30, 1995, 4 Sheets.

Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.

12 C.F.R. Part 329—Interest on Deposit, Source: 51 FR 10808, Mar. 31, 1986, 5 Sheets.

Merriam-Webster Online Dictionary, 10th Edition, Definition of "Associated", 2 Sheets.

Merrill Lynch & You, "Financial Services the Way You Want, When You Want Them," Jan. 2000 4 Sheets.

Merrill Lynch, Pierce, Fenner & Smith Incorporated, "Information Statement," 2000, 12 Sheets.

MONEY FUND BANKING SYSTEM

The present application is a Divisional of application Ser. No. 10/305,439 filed Nov. 26, 2002, which is a Continuation-in-Part of application Ser. No. 09/677,535 filed Oct. 2, 2000, and Ser. No. 10/071,053 filed Feb. 8, 2002, which are Continuations of application Ser. No. 09/176,340 filed Oct. 21, 1998 (U.S. Pat. No. 6,374,231 B1); all these applications are incorporated herein by reference in their entireties for all purposes.

BACKGROUND OF THE INVENTION

1. Field of the Invention

The novel system is in the field of account transaction processing and provides an administered money fund banking system that is integrated with an insured deposit account.

2. State of the Art

The Federal Deposit Insurance Corporation ("FDIC") is a federal governmental entity that provides insurance for deposits in most banks and savings institutions in the United States. Bank deposits are insured by the FDIC's Bank Insurance Fund ("BIF") and savings institutions' deposits are insured by the FDIC's Savings Association Insurance Fund ("SAIF"). The rules governing insurance of deposits of institutions insured by the BIF and the SAIF are the same. The FDIC bases insurance coverage on the concept of ownership rights and capacities: funds held in different ownership categories are insured separately from each other, and funds of the same ownership but held in different accounts are subsumed under the same insurance coverage. The amount of insurance covered provided to depositors of each institution insured by BIF and SAIF is the same: $100,000.00 to the owner(s) of the funds in the account(s), including principal and interest.

Title 12, Part 329, of the Code of Federal Regulations ("CFR") specifies that "no bank shall, directly or indirectly, by any device whatsoever, pay interest on any demand deposit." (12 C.F.R. §329.2.) A "deposit" is any money put into a savings account, a checking account, or time account such as a certificate of deposit. A "demand" account is one from which the owner of the account can demand that funds be drawn and paid elsewhere, either to another account (of the same or a different owner) or to a third party. These payments are typically made via a bank draft or check, or a credit or debit card. A account different than a demand account is an account where all or a fixed amount of the principal must be maintained in the account for a period of time to achieve the particular benefits offered by that account. As stated in this section of the CFR, a "demand deposit" includes any deposit in account under which terms the depositor is authorized to make, during any month or statement cycle of at least four weeks, more than six transfers by means of a preauthorized or automatic transfer of telephone (including data transmission) agreement, order or instruction, which transfers are made to another account of the depositor at the same bank, to the bank itself, or to a third party provided that such an account will be deemed a demand deposit if more than three of the six authorized transfers are authorized to be made by check, draft, debit card or similar order made by the depositor. (12 C.F.R. §329.1 (b)(3).) On the other hand, withdrawals from a deposit account are not deemed to be included within the six transfers permitted for a non-demand account when the withdrawals are made by mail, messenger, telephone (via check mailed to the depositor), automated teller machine, or in person. In essence, unless the funds of a deposit are held in a NOW account (18 U.S.C. 1832(a)), an account in which a depositor has the ability to make at least six transfers will be deemed a demand account and no interest will be payable on the funds therein. Therefore, owners of demand accounts are denied interest on their funds.

SUMMARY OF THE INVENTION

In light of this regulatory scheme, it would be beneficial to provide depositors of demand accounts with interest from the funds on deposit while simultaneously providing unlimited (or at least six) transfers of the funds therein. For example, it would be beneficial to provide such depositors with the ability to deposit funds into the demand account from various sources, and to make payments from the demand account via different instruments, without limitation as to the number of transfers, and still earn interest on the funds in the clients' accounts.

To accomplish these and other objectives, this invention provides a system for managing a plurality of accounts for multiple clients by administering at a banking institution a single insured deposit account in which all of the funds for the insured deposit accounts are held, providing a database having client information for each client's account, administering clients' deposits to and withdrawals from each of their accounts, authorizing whether funds in a particular client's account can be used for each payment requested from that clients account, determining as the net transaction of the sum of the insured money market account deposits and withdrawals from the plurality of insured money market accounts on a regular periodic basis, using the determination of the net transaction to deposit funds to or withdraw funds from the single insured deposit account, distributing interest earned on the single deposit account to each of the clients in proportion to their portion of funds in the deposit account, and updating the database for each client's deposits and authorized demand payments.

DESCRIPTION OF SPECIFIC EMBODIMENTS OF THE INVENTION

The present system will be described with reference to an administrator, which can be brokerage, a bank, or another entity with which clients can institute financial transactions such as deposits and demand payments. The administrator appears to each client as if it were, in part, a bank, by accepting deposits for the client's account and by authorizing (and then making) payments demanded by the client from his account. The funds for all of the clients are pooled into a single fund that is maintained as an insured deposit account at a licensed banking institution. This system is preferably implemented in combination with a brokerage account so that the client can centralize all of his financial needs: deposit of funds; demand orders for payment (checking); payment authorization by debit card; securities transactions; retirement plans; and the like.

The following description of the hardware and software is for exemplification of a working system; other architectures can be fashioned to make the systems and perform the methods claimed herein. The system has been implemented on a mainframe computer (e.g., an IBM Application Starterpac 3000 model A20, which is capable of processing 63 million instructions per second) with an operating system such as OS/390 and MVS/ESA running a relational database (e.g., DB2 type database). The programming languages are IBM COBOL, CICS languages along with IBM's CSP screen generation language. For such a system, memory requirements are satisfied with 768 Gigabytes of storage (preferably, e.g., 1024G with a disk storage and recovery system, such as RAID), Communications generally are run on a mixed SNA and TCPAP network. Communications with a local area network via a local control unit can be implemented using a token ring. Connection to an internal network has been made via an IBM open systems adapter (OSA) running TCP/IP, which allows File Transfer Protocol (ftp) via a firewall. Bisynchronous and synchronous file transfer protocols are made through various dial-up media. Terminal Access runs on an Ethernet local area network, using an SAA gateway, and other gateways (e.g., Cytrix and Netsoft) for remote access. Additionally, several lease lines for several applications and terminal access are supported by the system.

Figure 1:
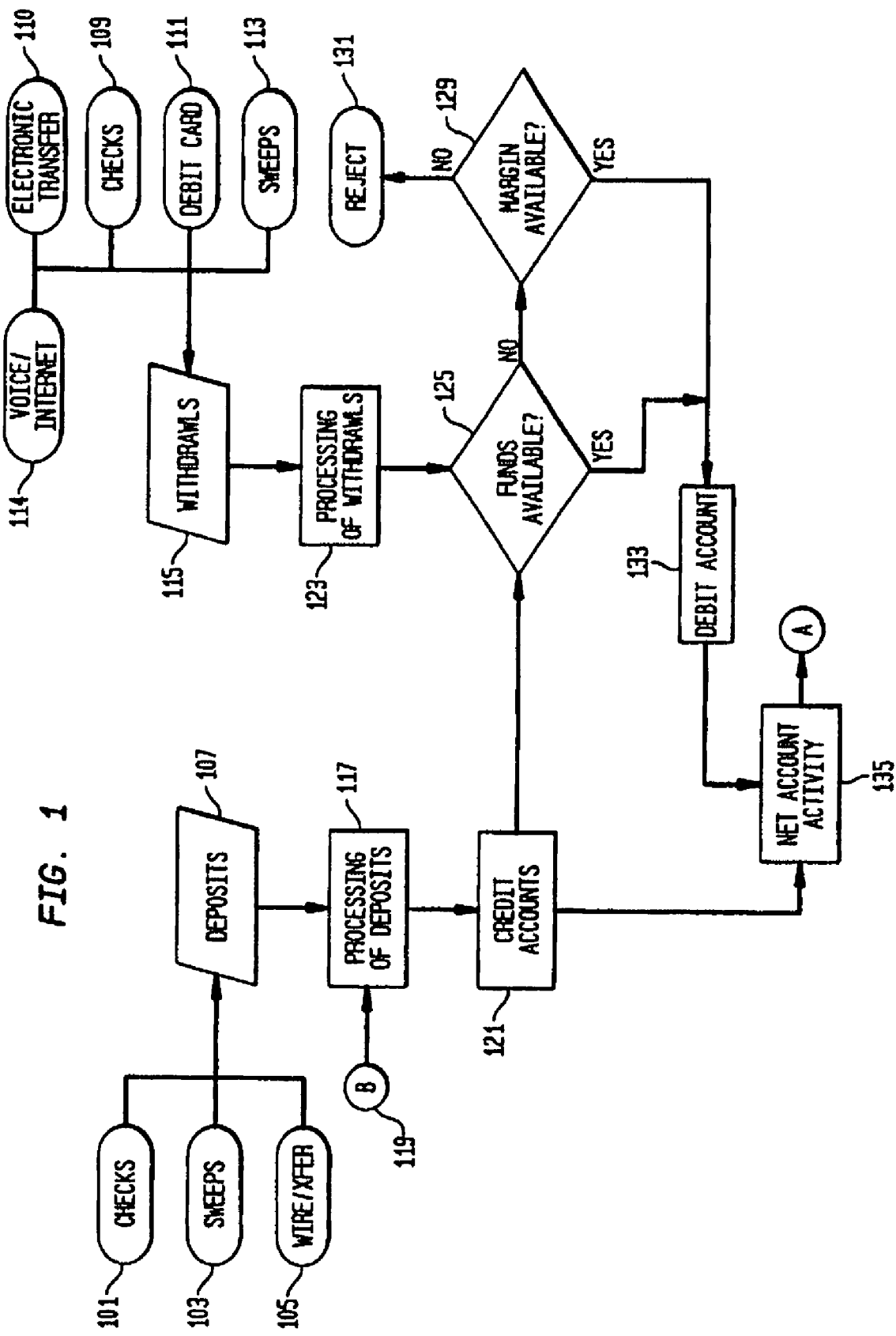
FIGS. 1 and 2 illustrates a flow chart depicting certain processing steps the system follows.
Figure 2:
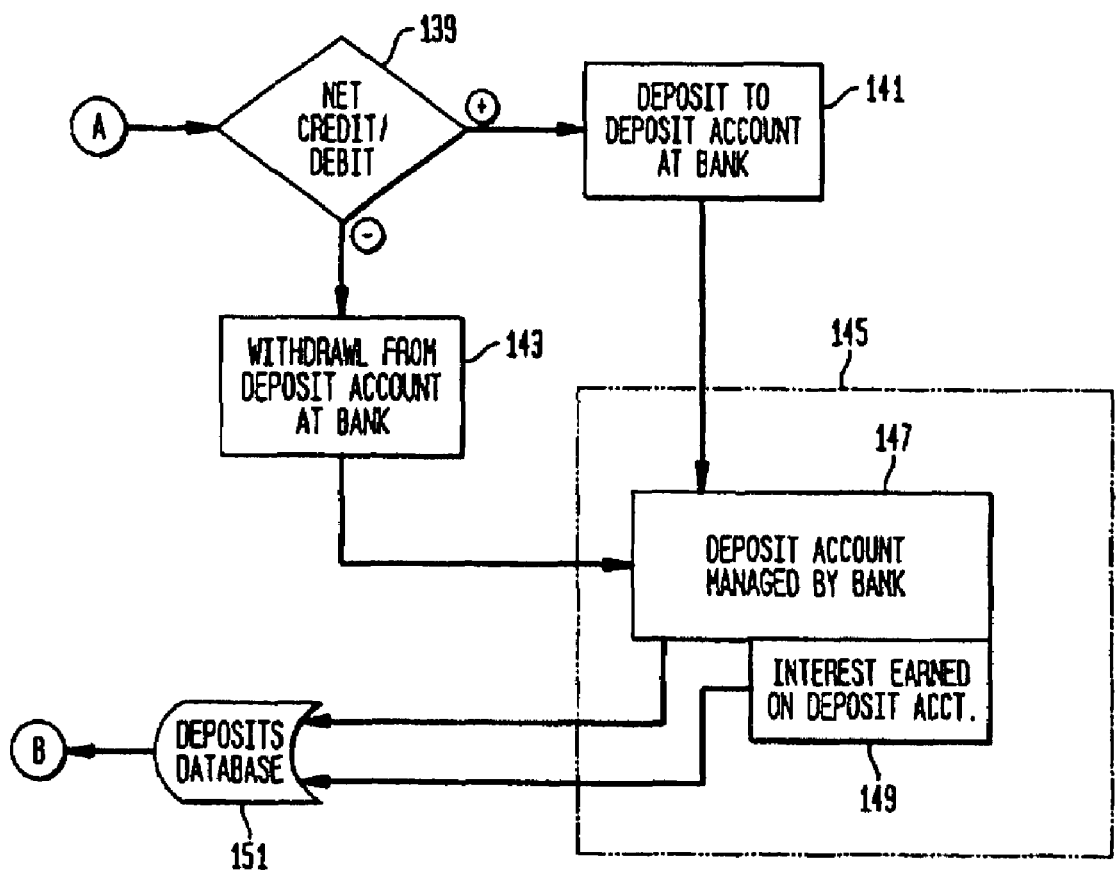

FIG. 1 is a flowchart depicting certain processing steps the system follows at the administrators end. It should be understood that the order in which these steps are performed may be varied without impairing the achievement of the aforementioned objects of the invention. The client adds funds ("deposits") to his account typically via check 101, sweeps 103 of funds from another account (e.g., a broker/dealer account), and/or by wire and other transfers 105 (such as fed funds wire and direct deposit via ACH) for investment in an FDIC insured money fund account. These funds are deposited in a deposit account with a bank on behalf of the participant. The amount of each of the deposited items is summed 107 to determine the deposits for each client, preferably on a regular periodic basis (e.g., daily) or instantaneously. On the other side, the administrator provides the participant with access to his funds by various methods: payments can be made from funds drawn from the account by check 109; electronic funds transfer 110; debit card 111 authorized by the client (and ACH debit); sweeps of funds 113 to another account (e.g., a broker/dealer account); and electronic and voice access 114 (e.g., interne online banking, banking by telephone) for automated transaction requests; and transactions authorized by mail A "sweep" is a an automated movement of funds between a client's other account (e.g., a broker/dealer account) and his insured deposits account (in either direction). The registration on the other account and the insured deposit account are identical; there is a one for one relationship between the brokerage account and the insured deposits account.

The sum of the deposits is processed 117 with information 119 from a database (described later) that stores information about the demand account for each client. Each clients account is credited 121 with the sum of the deposits for that particular account, which may amount to zero on a particular day. Similarly, the sum of withdrawals are processed 123 to determine what should be debited from the account, which may also amount to zero on a particular day. The deposits and withdrawals for each account during a given period are compared 125 to determine whether sufficient funds are present in the client's account, including the added funds, to pay the withdrawals requested by the client. In other words, processing determines which client accounts to credit or debit for the various transactions (sweep, checks, debit cards, ACH, etc.) received each business period (e.g., daily). These transactions can be received from one or more sources, such as brokerage firms (sweep transactions), banks (deposits made by wire transfer, checks presented for payment, ACH, debit card transactions), the mail (check deposits, redemption requests), and telephone requests. "Telephone" requests can be performed by voice, conversing with an operator/broker or a voice response system, or via a touch-tone phone using a menu system, or electronically via the interne using email or the World Wide Web (e.g., a web page, preferably secure, onto which users can log in and conduct on-line banking). The final step in the day's processing is to determine the net credit or debit for the deposit account at the bank; the net activity represents all transactions that were processed that day for all insured deposit accounts.

If sufficient funds are not available for drafts and other orders to pay, the requested withdrawal(s) are denied and the client's total account information is again accessed to determine 129 if the client has sufficiently available margin to cover the requested withdrawal(s) (other than, preferably, sweep transactions),If insufficient funds and insufficient margin are available, then the requested withdrawal is denied 131. The client's margin typically is determined by the value of the client's funds held in the client's broker/dealer (securities) account. When sufficient funds are available in the insured deposit account, or a sufficient margin is available in the client's securities account with the administrator, then a debit is made 133 to the client's insured deposit account in the amount of the withdrawal(s) allowed (based on the funds and margin then available) and the processed and authorized withdrawals are paid as directed by the client. The sum of the processed credits 121 and the processed debits 133 are determined for all of the administrators clients to arrive at a net account activity determination 135. The order in which credits and debits are processed depends upon a subjective protocol and/or operation of law. For example, transactions that are pre-approved (such as authorized debit card transactions, and sweeps) are likely to be processed when received; transactions requiring authorization or acceptance by a third party (such as a bank draft or check) may be credited to the insured deposit account but not available for withdrawal until authorization or acceptance.

The net account activity determination 135 is then used to determine a net credit/debit 139 for the single deposit account held at the bank that contains all of the funds of all of the administrator's clients; the deposit account must be debited or credited to account for all clients' deposits and withdrawals during the period. If the net result is positive (e.g., amount of deposits processed minus amount of authorized withdrawals processed is positive), then the calculated amount is deposited 141 to the single account. If the net result is negative(e.g., amount of deposits processed minus amount of withdrawals processed is negative), then the calculated amount is withdrawn 143 from the single deposit account. An individual insured money market account is maintained for each client on a administrator's database. Each transaction received for an account is individually posted against the client's account on the database. Funds are exchanged between the appropriate parties to cover transactions (broker for sweep transactions; bank for debit cards, checks, ACH, etc.). These transactions are posted and settled prior to any activity taking place in the insured deposit account at the bank. In a preferred embodiment, the last movement of funds on each day is the net movement of funds (credit or debit) that takes place in the deposit account at the bank. The sum of the account balances (principle plus interest) for clients participating in the this system equals the balance in the deposit account at the bank.

The information from the calculations of a net credit/debit 139 are used to implement the processing of the actual deposit or withdrawal (141, 143) to the deposit account, and that information (and funds, if required) is sent to the bank 143 to execute the actual deposit or withdrawal required. If the deposit account is to be credited, then deposits are transferred to the bank and credited to the deposit account 147; conversely, if funds are to be withdrawn from the deposit account, a bulk withdrawal is made from the deposit account to account for the withdrawals that have been authorized from the clients' accounts; in essence, the withdrawal from the deposit account need only make up the difference between the authorized withdrawals and the deposits. If the client wishes to use his excess margin buying power for overdraft protection, the broker/dealer transmits the client's available margin line to the administrator regularly (preferably daily), The available margin line will be taken into consideration when checks, debit card, and other draft and order to pay transactions (e.g., ACH debits, on-line banking withdrawals, and other electronic payments) are processed. If the client's margin line is used to process a check or debit card transaction, a loan will be created and transmitted to the broker dealer by the administrator. Preferably, the broker dealer maintains the margin loan on his system and will pay the administrator for all funds advanced. Using this methodology for margin accounts, there is no effect on the deposit account at the bank.

The bank pays interest 149 on the single deposit account to the administrator. Based on the amount of each client's funds in the deposit account as a function of the total amount in the deposit account, the administrator determines the interest amount (if any) each client is owed (based also on the period during which the interest was determined on a particular account balance). Because all of the clients' funds are in a single account under the name of the administrator, the administrator earns the interest and distributes the interest earned to each of the clients. Further, the limitation on transfers from an interest-bearing account is inapplicable to the clients because their funds are held by the administrator in a demand account and interest for the client is determined only on that portion of those funds maintained in the bank's deposit account. Preferably, if necessary, the administrator makes any withdrawals from the deposit account in person.

After the deposit account has been credited or debited in accordance with the determination for that period of the sum of the deposits and withdrawals from clients, and the interest earned on the single deposit account, this information is transferred back to the administrator's deposits database 151. This database includes information about each client (such as name, address, and other important or desired demographic and tax information about each client's account), as well as financial information regarding the client's holdings on deposit in the bank (i.e., that client's portion of the single deposit account) and holdings with the administrator (e.g., securities and the like).

As seen, the administrator maintains several relationships that provide services for the insured money market accounts. These various entities provide transaction data that is transmitted to the administrator and processed. Preferably, the administrator is it's own transfer agent and provides a shareholder accounting system. Preferably, accounts may be opened through a broker dealer that is a client of the administrator, or directly with an application and check.

The administrator may allow a client with an account under the present system to access his funds by check or with a debit card; in such a case, the administrator has arranged for these services and maintains these relationships which are separate and apart from the deposit account. Banks that provide check and card services will transmit a file each day to the administrator that contains the checks presented for payment and/or the debit card transactions. The transactions that apply to his account under the present system are out sorted and processed against the administrator's database. The administrator will settle with each bank for the transactions that were processed.

The administrator may accept direct deposit of payroll, social security, or pensions for accounts. The clients' accounts are updated as these files are received and processed. The administrator may also accepts ACH debit transactions, which are initiated by the client's bank or a third party at the client's request.

The administrator may also provide the participants with automated bill paying services. Participants preferably provided with a touchtone bill paying system and/or an Internet on line banking service. Bill payment requests may be downloaded each morning for processing.

The foregoing description is meant to be illustrative and not limiting. Various changes, modifications, and additions may become apparent to the skilled artisan upon a perusal of this specification, and such are meant to be within the scope and spirit of the invention as defined by the claims.

What is claimed is:

1. A system for managing a plurality of client transaction accounts of a banking institution associated with a plurality of respective clients of the banking institution for a plurality of transactions, comprising:
   one or more computers programmed to be capable of performing the following operations:
   (a) accessing one or more databases for carrying out one or more of the following steps, wherein the database comprises information for each client transaction account, wherein client transaction account funds for the client transaction accounts are aggregated in one or more FDIC-insured and interest-bearing aggregated deposit accounts held at the banking institution, and wherein the information for each of the client transaction accounts includes information on each client's funds held in said one or more insured and interest-bearing aggregated deposit accounts;
   (b) administering client deposits/transfers to and withdrawals/transfers from said client transaction accounts using the one or more computers, said administering step comprising processing more than six (6) withdrawals/transfers selected from the group consisting of check, debit card, ACH, and credit card within a month from each of a plurality of said client transaction accounts;
   (c) determining by the one or more computers on a regular basis at least one aggregated net transaction for a plurality of said clients comprising a sum of said clients' deposits/transfers to and withdrawals/transfers from said respective clients' transaction accounts at the banking institution;
   (d) determining by the one or more computers from said at least one aggregated net transaction whether to deposit/transfer funds to or withdraw/transfer funds from said one or more FDIC-insured and interest-bearing aggregated deposit accounts;
   (e) processing needed deposits/transfers to, or needed withdrawals/transfers from said one or more FDIC-insured and interest-bearing aggregated deposit accounts based on said determining from said at least one aggregated net transaction step, so that more than six (6) withdrawals/transfers are made during a month from one of said one or more FDIC-insured and interest-bearing aggregated deposit accounts via at least one intermediate bank that is different from the banking institution; and
   (f) updating by the one or more computers the database with each client's deposits/transfers to and withdrawals/transfers from said each client's respective transaction account.

2. The system of claim 1, wherein said one or more computers are programmed to make withdrawals by draft or check, credit card, sweeps, wire or electronic transfer and combinations thereof.

3. The system of claim 1, wherein the one or more computers are further programmed to deny a withdrawal transaction from one of the client transaction accounts if that client transaction account does not have sufficient funds to cover that withdrawal transaction, or access to sufficient margin or line of credit.

4. The system of claim 1,
wherein said one or more computers are programmed to facilitate a manner of making said withdrawals/transfers and/or deposits/transfers from at least one of said one or more FDIC-insured and interest-bearing deposit accounts to preserve that account's interest-bearing status regardless of the number of said withdrawals and/or transfers from said at least one of said one or more FDIC-insured and interest-bearing deposit accounts.

5. The system of claim 1, further comprising the one or more computers programmed to be capable of performing the step of, after accrual in the one or more aggregate deposit accounts, distributing interest to each of the client transaction accounts in dependence on a balance in that respective client transaction account.

* * * * *